(12) United States Patent
Tsumiyama et al.

(10) Patent No.: US 9,944,320 B1
(45) Date of Patent: Apr. 17, 2018

(54) UTILITY VEHICLE

(71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/393,447

(22) Filed: Dec. 29, 2016

(51) Int. Cl.
*B62D 21/02* (2006.01)
*B60K 17/04* (2006.01)
*B62D 21/11* (2006.01)
*B60R 21/13* (2006.01)
*B60G 13/00* (2006.01)

(52) U.S. Cl.
CPC .......... *B62D 21/02* (2013.01); *B60G 13/005* (2013.01); *B60K 17/04* (2013.01); *B60R 21/13* (2013.01); *B62D 21/11* (2013.01); *B60G 2204/1431* (2013.01); *B60G 2204/15* (2013.01); *B60G 2300/07* (2013.01); *B60Y 2200/20* (2013.01)

(58) Field of Classification Search
CPC ......... B62D 21/02; B62D 21/11; B60R 21/13; B60K 17/04; B60G 13/005; B60G 2204/1431; B60G 2204/15; B60G 2300/07; B60Y 2200/20
See application file for complete search history.

(56) References Cited

U.S. PATENT DOCUMENTS

| 8,869,929 | B2 | 10/2014 | Yamamoto | |
|---|---|---|---|---|
| 9,771,112 | B2* | 9/2017 | Spindler | B62D 23/005 |
| 2004/0195797 | A1* | 10/2004 | Nash | B60G 7/02 |
| | | | | 280/124.136 |
| 2010/0314191 | A1* | 12/2010 | Deckard | B60N 2/01 |
| | | | | 180/312 |
| 2012/0223500 | A1* | 9/2012 | Kinsman | B60G 3/20 |
| | | | | 280/124.153 |
| 2013/0319785 | A1* | 12/2013 | Spindler | B62D 23/005 |
| | | | | 180/292 |
| 2014/0265285 | A1* | 9/2014 | Erspamer | B60N 2/6009 |
| | | | | 280/783 |
| 2015/0061275 | A1* | 3/2015 | Deckard | B60G 21/055 |
| | | | | 280/788 |
| 2017/0057546 | A1* | 3/2017 | Dressel | B62D 21/15 |
| 2017/0174027 | A1* | 6/2017 | Mailhot | B60G 3/20 |

* cited by examiner

*Primary Examiner* — Darlene P Condra
(74) *Attorney, Agent, or Firm* — Wenderoth, Lind & Ponack, L.L.P.

(57) ABSTRACT

A vehicle including: left and right bottom frames, extending in a front-rear direction, supporting a floor plate; a rear-gear support; a bottom rear frame coupling rear ends of the bottom frames, extending in a width direction, to which the rear-gear support is welded; left and right upper frames, extending in the front-rear direction, supporting a cargo bed; a rear lateral frame, coupling rear ends of the upper frames extending in the width direction; left and right rear vertical frames, extending in a top-bottom direction, coupling the upper frames and the bottom rear frames; left and right rear L-shape frames, extending in the front-rear direction and the width direction, coupling the rear vertical frames and the rear lateral frame; and left and right arm supports, supporting rear-wheel support arms, and having upper ends coupled to the rear L shape frames and lower ends coupled to the rear gear support.

3 Claims, 8 Drawing Sheets

UTILITY VEHICLE

BACKGROUND OF THE INVENTION

1. Field of the Invention

The present invention relates to a utility vehicle.

2. Description of the Related Art

Conventionally, an arm support member that supports a rear-wheel support arm supporting a rear wheel of a utility vehicle extends upward, while being curved backward, from each of a pair of left and right main frames extending in a front-rear direction, as described in U.S. Pat. No. 8,869,929 B2.

SUMMARY OF THE INVENTION

In order to obtain predetermined strength, this arm support member needs to be formed with high dimensional accuracy by bending a thick plate member in a complicated manner.

In view of this, a purpose of the present invention is to provide a utility vehicle that includes an arm support member that is capable of supporting a rear-wheel support arm with a simple structure.

In order to achieve the above purpose, the present invention provides a utility vehicle including: a pair of left and right bottom frames that extend in a front-rear direction and support a floor plate; a rear gear support member that supports a gear box for rear wheels; a bottom rear frame that couples rear ends of the bottom frames and extends linearly in a vehicle width direction and to which the rear gear support member is welded; a pair of left and right upper frames that are provided above the bottom frames, extend in the front-rear direction, and support a cargo bed; a rear lateral frame that couples rear ends of the upper frames and extends in the vehicle width direction; a pair of left and right rear vertical frames that extend in a top-bottom direction and couple the upper frames and the bottom rear frames; a pair of left and right rear L shape frames that are provided above the rear gear support member, extend in the front-rear direction and the vehicle width direction, and couple the rear vertical frames and the rear lateral frame; and a pair of left and right arm support members that support rear-wheel support arms supporting the rear wheels, the arm support members being configured such that upper ends thereof are coupled to the rear L shape frames and lower ends thereof are coupled to the rear gear support member.

According to the configuration, the arm support members are configured such that the upper ends thereof are coupled to the rear L shape frames located above the rear gear support member and the lower ends thereof are coupled to the rear gear support member. It is therefore possible to provide the utility vehicle including the arm support members that are capable of supporting the rear-wheel support arms with a simple structure without the need to bent the arm support members in a complicated manner.

The present invention preferably further includes the following configurations.

(1) The arm support members extend linearly in the top-bottom direction.

(2) The utility vehicle further includes shock absorbers that elastically couple the rear-wheel support arms to a vehicle body, the shock absorbers being supported by parts where coupling members that couple the upper frames and the rear L shape frames are coupled to the upper frames, respectively.

According to the configuration (1), the arm support members extend linearly in the top-bottom direction. Since the arm support members need not extend while being curved in the top-bottom direction, it is possible to easily manufacture the arm support members with precision.

According to the configuration (2), the shock absorbers are supported by the parts where the coupling members that couple the upper frames and the rear L shape frames are coupled to the upper frames, respectively. Since the shock absorbers are supported by parts having high strength, i.e., the parts where the coupling members are coupled to the upper frames, it is possible to improve the support rigidity of the shock absorbers as compared with a case where the shock absorbers are supported by intermediate parts of the rear cross frame that couples the upper frames.

According to the present invention, it is possible to provide a utility vehicle including an arm support member that is capable of supporting a rear-wheel support arm with a simple structure.

DETAILED DESCRIPTION OF THE INVENTION

A utility vehicle according to an embodiment of the present invention will now be described below with reference to the accompanying drawings. A utility vehicle is a vehicle mainly for off-road travelling not only on a grass field, a gravel field, and a sandy field, but also on unpaved mountain road and forest road, a muddy road, and a rocky field. For convenience of description, it is assumed that a direction toward which the utility vehicle travels is a "front side" of the utility vehicle and parts thereof and that left and right, in a vehicle width direction, of a driver of the utility vehicle facing forward are "left and right" of the utility vehicle and the parts thereof.

[Overall Structure of Vehicle]

Figure 1:
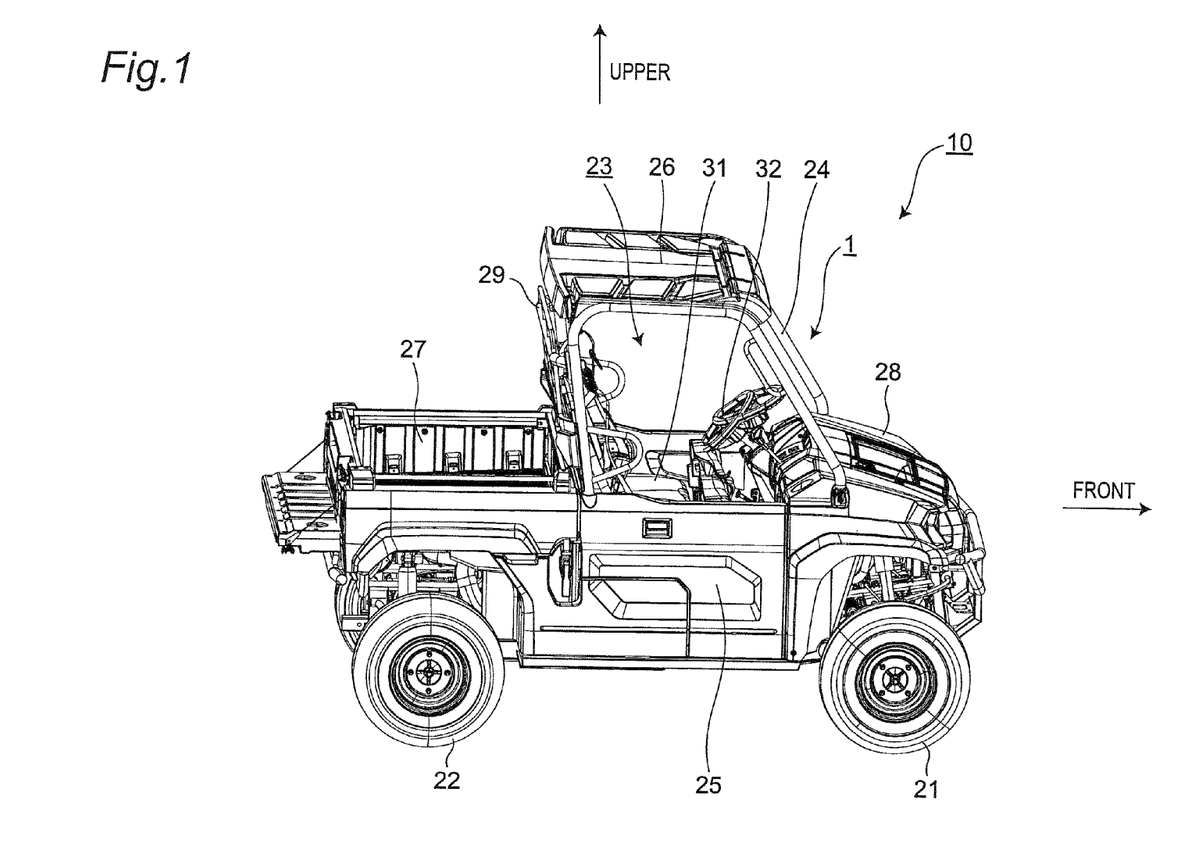
FIG. 1 is a perspective view of a utility vehicle according to an embodiment of the present invention.

FIG. 1 is a perspective view of a utility vehicle having a frame structure according to an embodiment of the present invention.

As illustrated in FIG. 1, a utility vehicle 10 includes a pair of left and right front wheels 21 on a front side of a body thereof, a pair of left and right rear wheels 22 on a rear side of the body, and a riding space (cabin) 23 between the front wheels 21 and the rear wheels 22. The riding space 23 is surrounded by a ROPS 24, a pair of left and right doors 25, and a top plate 26. The ROPS is an abbreviation of a rollover protective structure, and is part of a body frame 1. The top plate 26 is attached onto an upper end of the ROPS 24.

A cargo bed 27 is provided behind the riding space 23, and a bonnet 28 is provided ahead of the riding space 23. A screen 29 that serves as a partition between the cargo bed 27 and the riding space 23 is provided at a front end of the cargo bed 27.

A pair of left and right independent seats 31 are provided in the riding space 23. Operating units such as a steering wheel 32 and the like are provided ahead of the seats 31.

[Frame Structure]

Figure 2:
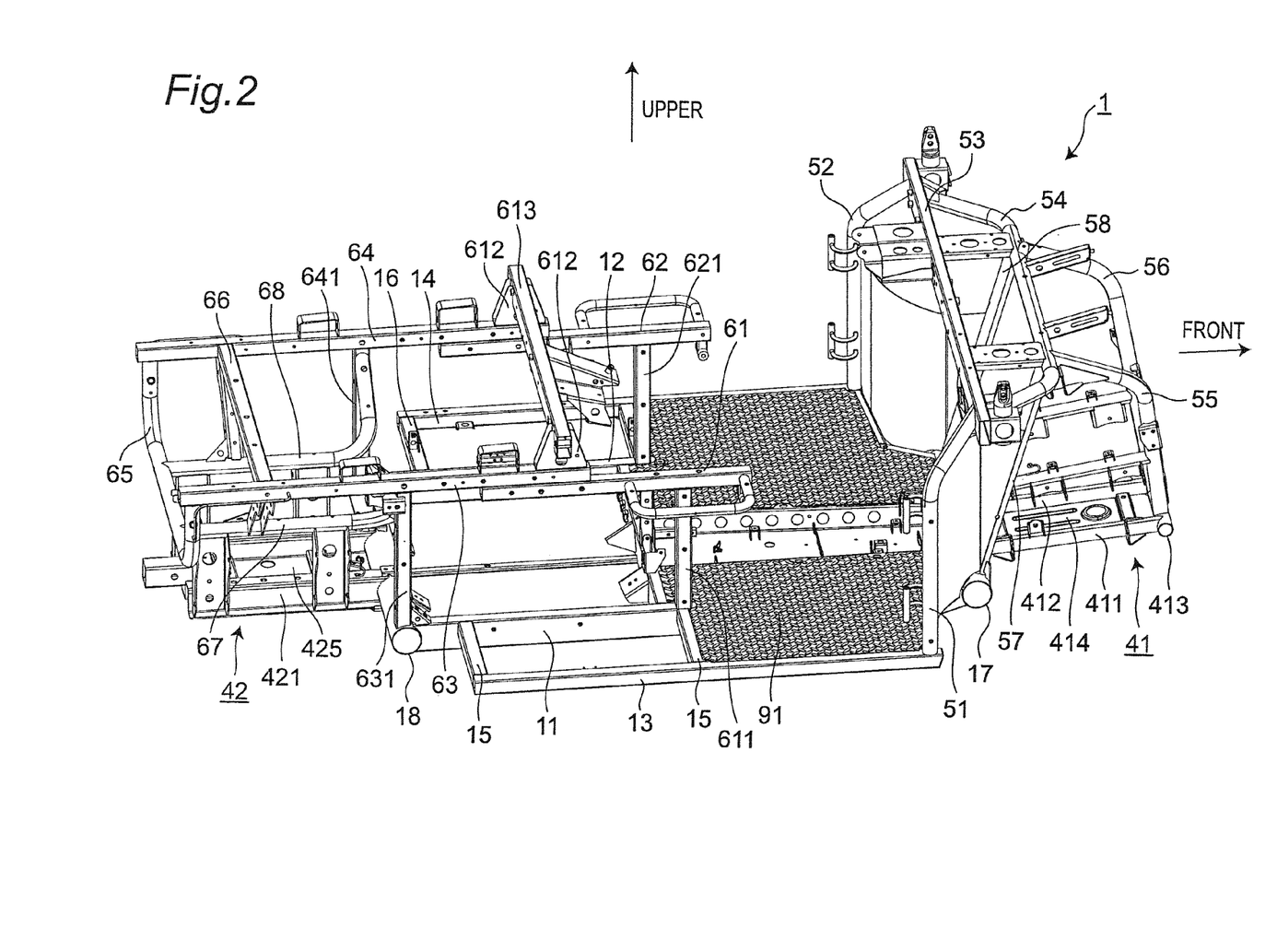
FIG. 2 is a perspective view of a body frame of the utility vehicle of FIG. 1.
Figure 3:
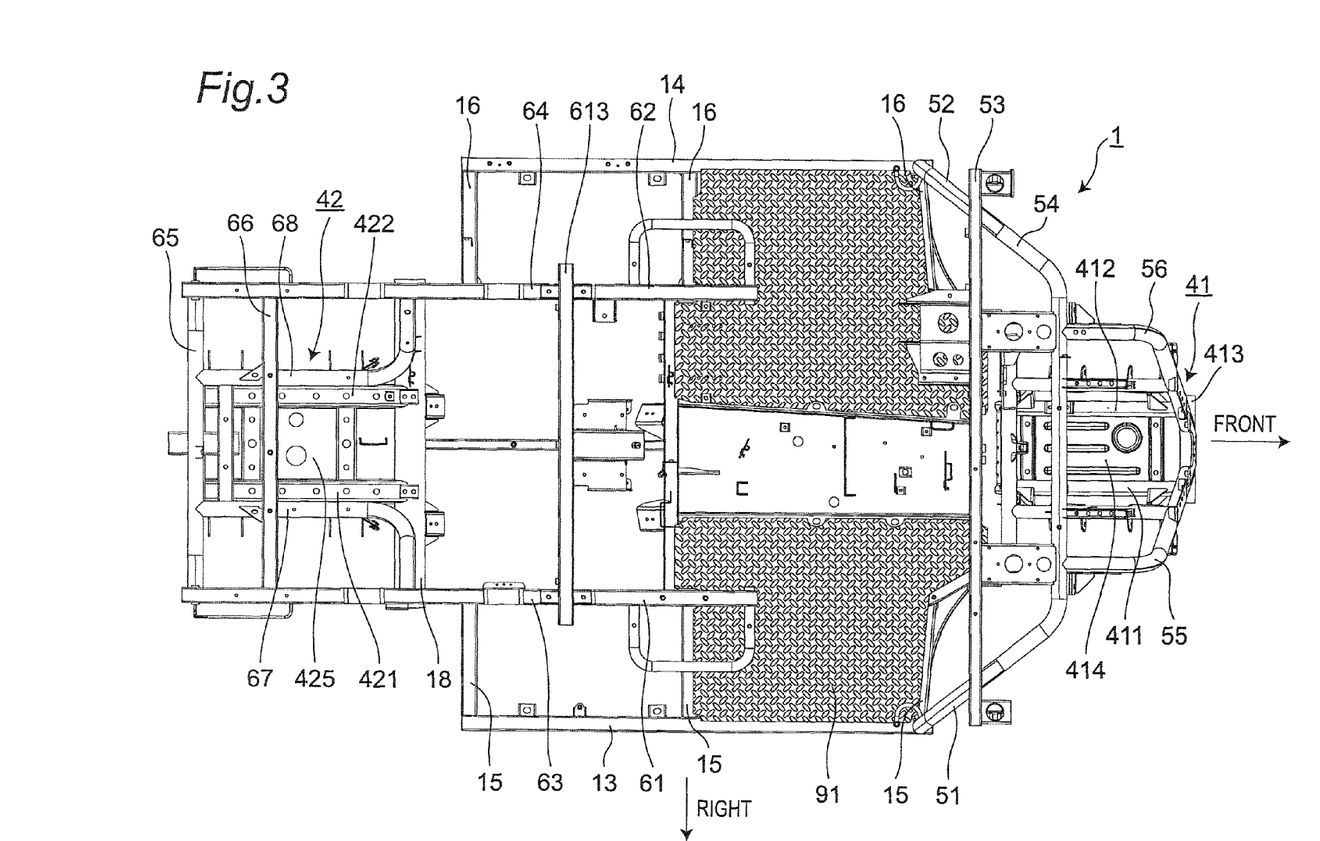
FIG. 3 is a top view of FIG. 2.
Figure 4:
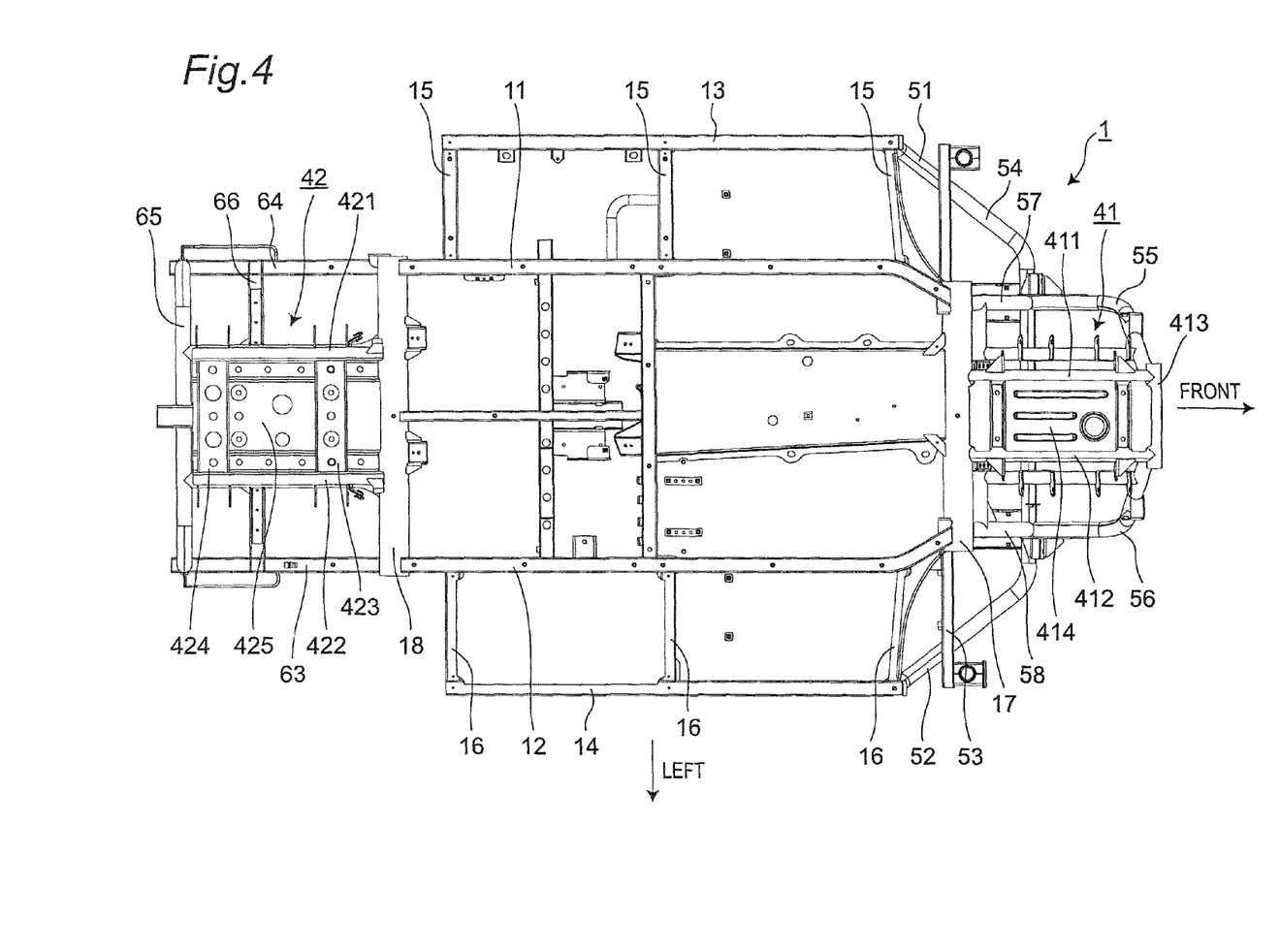
FIG. 4 is a bottom view of FIG. 2.
Figure 5:
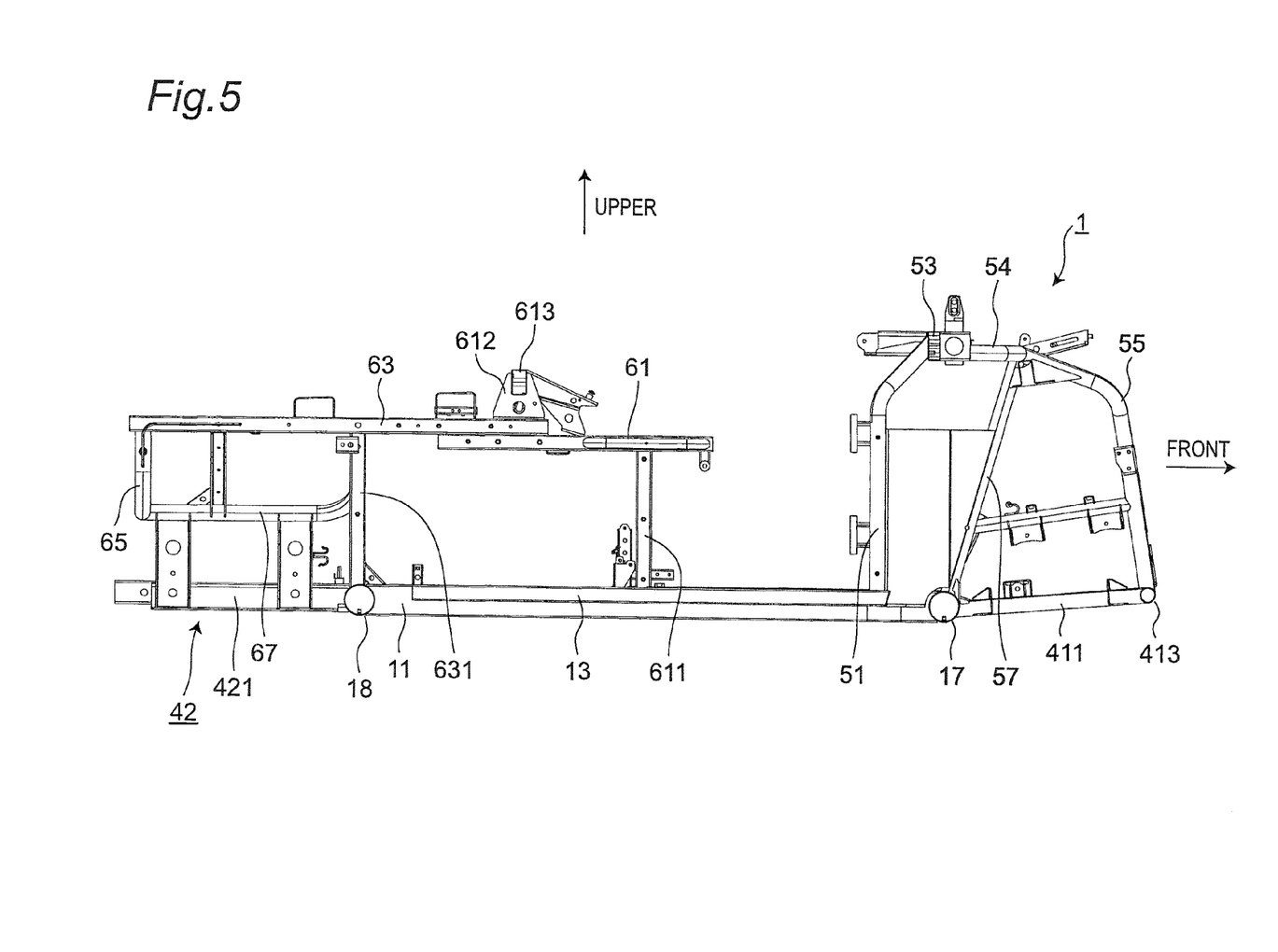
FIG. 5 is a right side view of FIG. 2.

FIG. 2 is a perspective view of the body frame 1 of the utility vehicle 10 of FIG. 1. FIG. 3 is a top view of FIG. 2, and FIG. 4 is a bottom view of FIG. 2. FIG. 5 is a right side view of FIG. 2. In FIGS. 2 to 5, the ROPS 24 of the body frame 1 is omitted.

As illustrated in FIGS. 2 to 5, the body frame 1 includes, in a bottom portion thereof, a pair of left and right bottom first frame 11 and bottom second frame 12 that extend substantially horizontally in a front-rear direction and support a floor plate 91 and a pair of left and right bottom side frames 13 and 14 that are provided on outer sides, in a vehicle width direction, of the bottom first frame 11 and the bottom second frame 12, extend substantially horizontally in the front-rear direction, and support the floor plate 91. The bottom first frame 11 and the bottom second frame 12 are square pipe frames.

The bottom first frame 11 and the bottom side frame 13 are coupled to each other by a plurality of bottom cross frames 15 that extend substantially horizontally in the vehicle width direction (left-right direction) and that are provided at certain intervals in the front-rear direction.

A door frame 51 that supports the door 25 is coupled to a front end of the bottom side frame 13. The door frame 51 extends upward from the front end of the bottom side frame 13 and then extends inward in the vehicle width direction toward the upper side.

The bottom second frame 12 and the bottom side frame 14 are coupled to each other by a plurality of bottom cross frames 16 that extend substantially horizontally in the vehicle width direction (left-right direction) and that are provided at certain intervals in the front-rear direction.

A door frame 52 that supports the door 25 is coupled to a front end of the bottom side frame 14. The door frame 52 extends upward from the front end of the bottom side frame 14 and then extends inward in the vehicle width direction toward the upper side.

The body frame 1 includes a bottom front frame 17 that couples a front end of the bottom first frame 11 and a front end of the bottom second frame 12 and that extends substantially horizontally in a linear manner in the left-right direction. The bottom front frame 17 is a cylindrical pipe frame.

A ROPS mount front frame 53 is provided above the bottom front frame 17. The ROPS mount front frame 53 extends substantially horizontally in the left-right direction and couples an upper end of the door frame 51 and an upper end of the door frame 52, and the ROPS 24 is coupled to the ROPS mount front frame 53. A front U shape frame 54 having a U shape protruding toward the front side is coupled to a front portion of the ROPS mount front frame 53.

A front gear support member 41 that supports a gear box for front wheels from below is provided ahead of the bottom front frame 17. The front gear support member 41 includes a pair of left and right front gear support frames 411 and 412 that extend in the front-rear direction so as to be inclined upward toward the front side, a front gear support front frame 413 that couples front ends of the front gear support frames 411 and 412, and a front gear under guard 414 having a rectangular shape that couples intermediate portions of the front gear support frames 411 and 412. The front gear support frames 411 and 412 are joined to the bottom front frame 17 by welding.

A pair of left and right front curved frames 55 and 56 are provided on a front portion of the front U shape frame 54. The front curved frames 55 and 56 extend from the front portion of the front U shape frame 54 downward toward the front side and then extend downward and are coupled to the front gear support front frame 413.

The front U shape frame 54 is coupled to left and right ends of the bottom front frame 17 by a pair of left and right front vertical frames 57 and 58 that extend downward and backward from a lower portion of the front U shape frame 54.

The body frame 1 includes a bottom rear frame 18 that couples a rear end of the bottom first frame 11 and a rear end of the bottom second frame 12 and that extends substantially horizontally in a linear manner in the left-right direction. The bottom rear frame 18 is a cylindrical pipe frame.

A rear gear support member 42 that supports a gear box for rear wheels from below is provided behind the bottom rear frame 18. The rear gear support member 42 includes a pair of left and right rear gear support frames 421 and 422 that extend substantially horizontally in the front-rear direction, a rear gear support intermediate frame 423 that couples intermediate portions, in the front-rear direction, of the rear gear support frames 421 and 422, a rear gear support rear frame 424 that couples rear portions, in the front-rear direction, of the rear gear support frames 421 and 422, and a rear gear under guard 425 having a rectangular shape that is supported by the rear gear support intermediate frame 423 and the rear gear support rear frame 424 from below. The rear gear support frames 421 and 422 are joined to the bottom rear frame 18 by welding.

A pair of left and right seat frames 61 and 62 that extend substantially horizontally in the front-rear direction and support the seats 31 are provided above the bottom first frame 11 and the bottom second frame 12. The seat frame 61 is coupled to the bottom first frame 11 by an intermediate vertical frame 611 extending in the top-bottom direction. The seat frame 62 is coupled to the bottom second frame 12 by an intermediate vertical frame 621 extending in the top-bottom direction.

An upper first frame 63 is provided above the seat frame 61. The upper first frame 63 is joined to an upper surface of a rear portion of the seat frame 61, extends substantially horizontally in the front-rear direction to a rear end of the vehicle body along the seat frame 61, and supports the cargo bed 27. An upper second frame 64 is provided above the seat frame 62. The upper second frame 64 is joined to an upper surface of a rear portion of the seat frame 62, extends substantially horizontally in the front-rear direction to the rear end of the vehicle body along the seat frame 62, and supports the cargo bed 27.

The upper first frame 63 is coupled to a right end of the bottom rear frame 18 by a rear vertical frame 631 extending in the top-bottom direction.

The upper second frame 64 is coupled to a left end of the bottom rear frame 18 by a rear vertical frame 641 extending in the top-bottom direction.

A ROPS mount rear frame 613 is provided above the upper first frame 63 and the upper second frame 64. The ROPS mount rear frame 613 extends substantially horizontally in the left-right direction and couples the upper first frame 63 and the upper second frame 64 via support members 612, and the ROPS 24 is coupled to the ROPS mount rear frame 613.

A rear end of the upper first frame 63 and a rear end of the upper second frame 64 are coupled by a rear U shape frame 65 having a U shape that extends in the left-right direction and protrudes downward. The upper first frame 63 and the upper second frame 64 are also coupled at intermediate portions thereof in the front-rear direction, by a rear cross frame 66 that extends substantially horizontally in the left-right direction.

The rear vertical frame 631 and the rear U shape frame 65 are coupled by a rear L shape frame 67 having a substantially L shape that extends inward in the vehicle width direction and backward from an inner side surface, in the vehicle width direction, of the rear vertical frame 631.

The rear vertical frame 641 and the rear U shape frame 65 are coupled by a rear L shape frame 68 having a substantially L shape that extends inward in the vehicle width direction and backward from an inner side surface, in the vehicle width direction, of the rear vertical frame 641.

[Structure of Arm Support Member]

Figure 6:
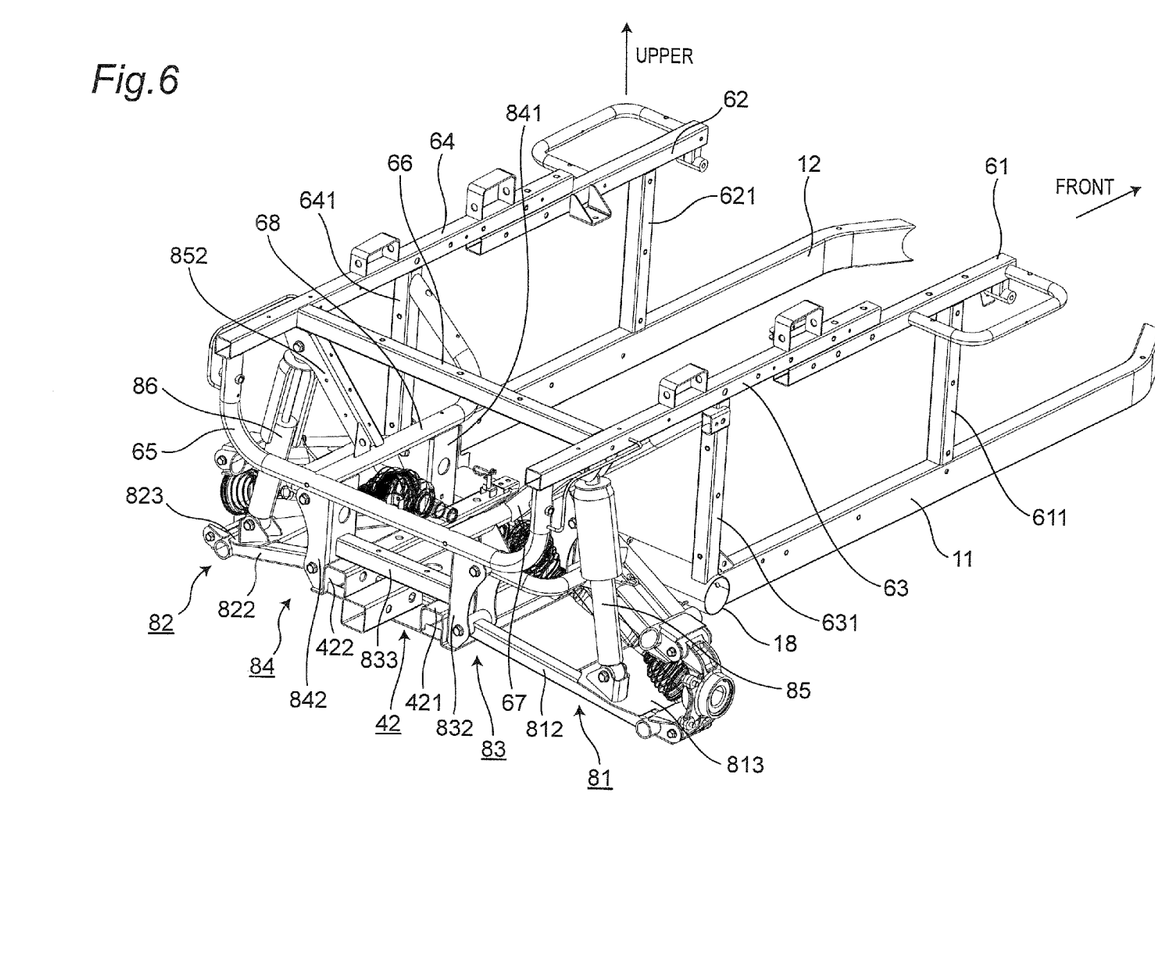
FIG. 6 is a perspective view of rear-wheel support arms that support rear wheels and surroundings thereof viewed from a rear side.
Figure 7:
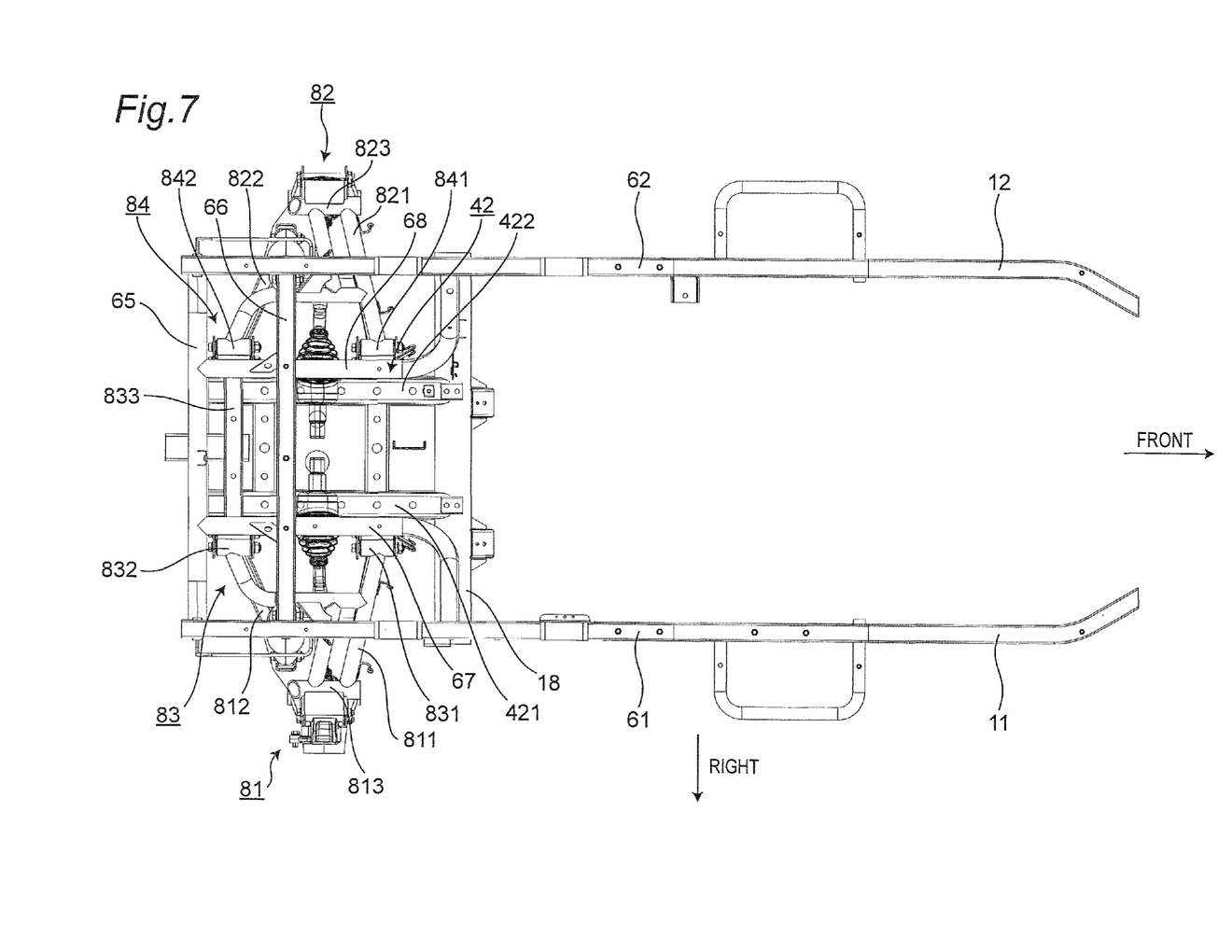
FIG. 7 is a top view of FIG. 6.
Figure 8:
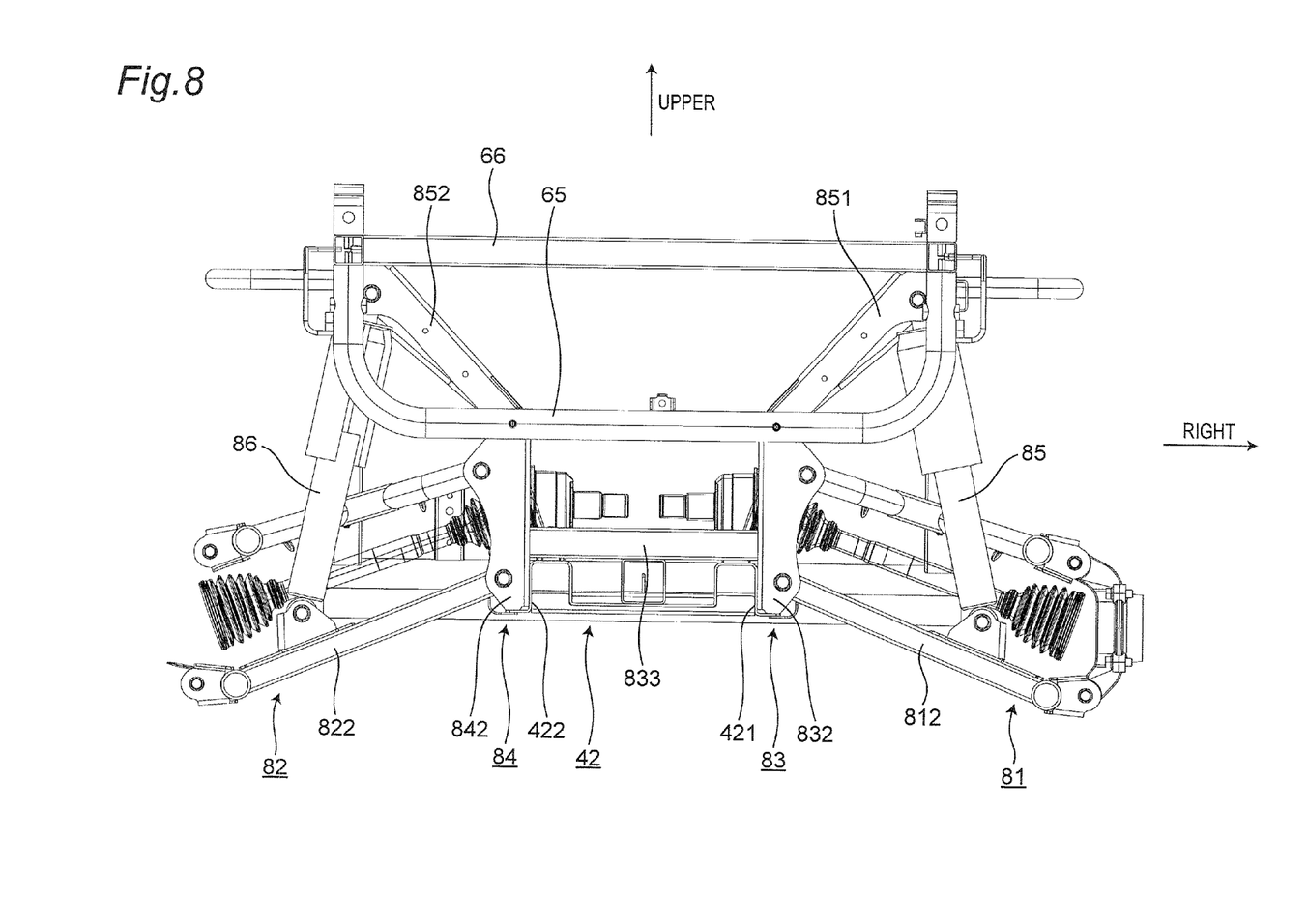
FIG. 8 is a rear view of FIG. 6.

FIG. 6 is a perspective view of rear-wheel support arms that support rear wheels and surroundings thereof viewed from a rear side. FIG. 7 is a top view of FIG. 6, and FIG. 8 is a rear view of FIG. 6. As illustrated in FIGS. 6 to 8, a pair of left and right rear-wheel support arms 81 and 82 that support the rear wheels 22 are provided. Each of the rear-wheel support arms 81 and 82 has an A shape in top view.

The rear-wheel support arm 81 includes a front member 811, a rear member 812, and a coupling member 813 that couples an outer portion, in the vehicle width direction, of the front member 811 and an outer portion, in the vehicle width direction, of the rear member 812.

The rear-wheel support arm 82 includes a front member 821, a rear member 822, and a coupling member 823 that couples an outer portion, in the vehicle width direction, of the front member 821 and an outer portion, in the vehicle width direction, of the rear member 822.

The rear-wheel support arms 81 and 82 are supported by arm support members 83 and 84, respectively. The arm support members 83 and 84 are a pair of left and right members. Upper ends of the arm support members 83 and 84 are coupled to rear L shape frames 67 and 68, respectively, and lower ends of the arm support members 83 and 84 are coupled to rear gear support frames 421 and 422 of a rear gear support member 42, respectively.

The arm support member 83 includes a front support member 831 and a rear support member 832, each of which is formed by bending a thick plate member. The front support member 831 extends linearly in the top-bottom direction perpendicular to the horizontal plane, and an upper end thereof is coupled right behind a curved portion of the rear L shape frame 67 that curves from an inner side, in the vehicle width direction, toward the rear side. The rear support member 832 extends linearly in the top-bottom direction perpendicular to the horizontal plane, and an upper end thereof is coupled to a rear end of the rear L shape frame 67. Since the rear L shape frame 67 extends backward substantially horizontally behind the curved portion, the length, in the top-bottom direction, of the front support member 831 and the length, in the top-bottom direction, of the rear support member 832 are the same. Behind the curved portion, the rear L shape frame 67 is located above the rear gear support member 42, especially directly above the rear gear support frame 421.

The arm support member 84 includes a front support member 841 and a rear support member 842, each of which is formed by bending a thick plate member. The front support member 841 extends linearly in the top-bottom direction perpendicular to the horizontal plane, and an upper end thereof is coupled right behind a curved portion of the rear L shape frame 68 that curves from an inner side, in the vehicle width direction, toward the rear side. The rear support member 842 extends linearly in the top-bottom direction perpendicular to the horizontal plane, and an upper end thereof is coupled to a rear end of the rear L shape frame 68. Since the rear L shape frame 68 extends backward substantially horizontally behind the curved portion, the length, in the top-bottom direction, of the front support member 841 and the length, in the top-bottom direction, of the rear support member 842 are the same. Behind the curved portion, the rear L shape frame 68 is located above the rear gear support member 42, especially directly above the rear gear support frame 422.

The front member 811 of the rear-wheel support arm 81 extends from a portion thereof coupled to the front support member 831 of the arm support member 83 so as to be inclined backward and downward toward an outer side in the vehicle width direction. The rear member 812 extends from a portion thereof coupled to the rear support member 832 so as to be inclined forward and downward toward an outer side in the vehicle width direction.

The front member 821 of the rear-wheel support arm 82 extends from a portion thereof coupled to the front support member 841 of the arm support member 84 so as to be inclined backward and downward toward an outer side in the vehicle width direction. The rear member 822 extends from a portion thereof coupled to the rear support member 842 so as to be inclined forward and downward toward an outer side in the vehicle width direction.

The rear support member 832 of the arm support member 83 and the rear support member 842 of the arm support member 84 are coupled by a lateral coupling member 833 that extends substantially horizontally in the vehicle width direction.

The rear-wheel support arm 81 is elastically coupled to a vehicle body by a shock absorber 85. Specifically, a lower end of the shock absorber 85 is coupled to the coupling member 813 of the rear-wheel support arm 81, and an upper end of the shock absorber 85 is coupled to a coupling member 851 that couples the upper first frame 63 and the rear L shape frame 67. A part where the shock absorber 85 and the coupling member 851 are coupled is supported by a part where the coupling member 851 and the upper first frame 63 are coupled. The shock absorber 85 extends from the part where the coupling member 851 and the upper first frame 63 are coupled toward the portion coupled to the coupling member 813 so as to be inclined downward toward an outer side in the vehicle width direction.

The rear-wheel support arm 82 is elastically coupled to the vehicle body by a shock absorber 86. Specifically, a lower end of the shock absorber 86 is coupled to the coupling member 823 of the rear-wheel support arm 82, and an upper end of the shock absorber 86 is coupled to a coupling member 852 that couples the upper second frame 64 and the rear L shape frame 68. A part where the shock absorber 86 and the coupling member 852 are coupled is supported by a part where the coupling member 852 and the upper second frame 64 are coupled. The shock absorber 86 extends from the part where the coupling member 852 and the upper second frame 64 are coupled toward the portion coupled to the coupling member 823 so as to be inclined downward toward an outer side in the vehicle width direction.

The shock absorber 85 and the shock absorber 86 are provided so as to be symmetrical with respect to a central line, in the vehicle width direction, of the vehicle body in rear view.

According to the utility vehicle 10 having the above configuration, the following effects can be produced.

(1) The arm support member 83 is configured such that the upper end thereof is coupled to the rear L shape frame 67 located above the rear gear support member 42 and the lower end thereof is coupled to the rear gear support member 42. It is therefore possible to provide the utility vehicle 10 including the arm support member 83 that is capable of supporting the rear-wheel support arm 81 with a simple structure without the need to bent the arm support member 83 in a complicated manner.

(2) The arm support member 84 is configured such that the upper end thereof is coupled to the rear L shape frame 68 located above the rear gear support member 42 and the lower end thereof is coupled to the rear gear support member 42. It is therefore possible to provide the utility vehicle 10 including the arm support member 84 that is capable of supporting the rear-wheel support arm 82 with a simple structure without the need to bent the arm support member 84 in a complicated manner.

(3) The arm support members 83 and 84 are configured such that the upper ends thereof are coupled to the rear L shape frames 67 and 68, respectively. This allows the arm support members 83 and 84 to have a shorter length in the top-bottom direction than in a case where the upper ends thereof are coupled to the upper frames 63 and 64, respectively. It is therefore possible to reduce the size of the arm support members 83 and 84. The arm support members 83 and 84 are not coupled to the upper frames 63 and 64, respectively. This reduces the number of members extending in the top-bottom direction below the upper frames 63 and 64, i.e., in a space below the cargo bed 27. It is therefore possible to improve ease of maintenance of an engine and auxiliaries thereof.

(4) The front support member 831 and the rear support member 832 of the arm support member 83 extend linearly in the top-bottom direction. Since the front support member 831 and the rear support member 832 need not extend while being curved in the top-bottom direction, it is possible to easily manufacture the arm support member 83 with precision.

(5) The front support member 841 and the rear support member 842 of the arm support member 84 extend linearly in the top-bottom direction. Since the front support member 841 and the rear support member 842 need not extend while being curved in the top-bottom direction, it is possible to easily manufacture the arm support member 84 with precision.

(6) The shock absorber 85 is supported by the part where the coupling member 851, which couples the upper first frame 63 and the rear L shape frame 67, is coupled to the upper first frame 63. Since the shock absorber 85 is supported by a part having high strength, i.e., the part where the coupling member 851 is coupled to the upper first frame 63, it is possible to improve the support rigidity of the shock absorber 85 as compared with a case where the shock absorber 85 is supported by an intermediate part of the rear cross frame 66 that couples the upper first frame 63 and the upper second frame 64.

(7) The shock absorber 86 is supported by the part where the coupling member 852, which couples the upper second frame 64 and the rear L shape frame 68, is coupled to the upper second frame 64. Since the shock absorber 86 is supported by a part having high strength, i.e., the part where the coupling member 852 is coupled to the upper second frame 64, it is possible to improve the support rigidity of the shock absorber 86 as compared with a case where the shock absorber 86 is supported by an intermediate part of the rear cross frame 66 that couples the upper first frame 63 and the upper second frame 64.

(8) The rear-wheel support arm 81 is inclined downward toward the outer side in the vehicle width direction. This makes a distance between the upper end and the lower end of the shock absorber 85 large. As a result, it is possible to improve shock-absorbing characteristics of the shock absorber 85.

(9) The rear-wheel support arm 82 is inclined downward toward the outer side in the vehicle width direction. This makes a distance between the upper end and the lower end of the shock absorber 86 large. As a result, it is possible to improve shock-absorbing characteristics of the shock absorber 86.

In the above embodiment, each of the rear-wheel support arms 81 and 82 includes the front member and the rear member each of which is supported by the arm support member 83 or 84. Alternatively, the front member and the rear member may be provided as a single member that is supported by an arm support member.

In the above embodiment, the lengths, in the top-bottom direction, of the front support members 831 and 841 of the arm support members 83 and 84 are the same as those of the rear support members 832 and 842 of the arm support members 83 and 84, respectively.

Alternatively, the lengths, in the top-bottom direction, of the front support members 831 and 841 may be different from those of the rear support members 832 and 842, respectively. In this case, the rear L shape frames 67 and 68 are inclined upward or downward toward the rear side behind the curved portions thereof.

Various modifications and changes can be made without departing from the spirit and scope of the present invention described in the claims.

The invention claimed is:

1. A utility vehicle comprising:
    a pair of left and right bottom frames that extend in a front-rear direction and support a floor plate;
    a rear gear support member that supports a gear box for rear wheels;
    a bottom rear frame that couples rear ends of the bottom frames and extends linearly in a vehicle width direction and to which the rear gear support member is welded;
    a pair of left and right upper frames that are provided above the bottom frames, extend in the front-rear direction, and support a cargo bed;
    a rear lateral frame that couples rear ends of the upper frames and extends in the vehicle width direction;
    a pair of left and right rear vertical frames that extend in a top-bottom direction and couple the upper frames and the bottom rear frames;
    a pair of left and right rear L shape frames that are provided above the rear gear support member, extend in the front-rear direction and the vehicle width direction, and couple the rear vertical frames and the rear lateral frame; and
    a pair of left and right arm support members that support rear-wheel support arms supporting the rear wheels, the arm support members being configured such that upper ends thereof are coupled to the rear L shape frames and lower ends thereof are coupled to the rear gear support member.

2. The utility vehicle according to claim 1, wherein the arm support members extend linearly in the top-bottom direction.

3. The utility vehicle according to claim 1, further comprising shock absorbers that elastically couple the rear-wheel support arms to a vehicle body, the shock absorbers being supported by parts where coupling members that couple the upper frames and the rear L shape frames are coupled to the upper frames, respectively.

* * * * *